United States Patent
Arima et al.

(10) Patent No.: US 8,286,993 B1
(45) Date of Patent: Oct. 16, 2012

(54) VEHICLE AIR BAG DEVICE

(75) Inventors: Takashi Arima, Yokohama (JP); Hideho Fukuda, Yokohama (JP); Yoshihiro Ohba, Yokohama (JP); Hironori Arakawa, Yokohama (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/529,157

(22) Filed: Jun. 21, 2012

Related U.S. Application Data (62) Division of application No. 12/738,586, filed as application No. PCT/JP2008/068341 on Oct. 9, 2008, now Pat. No. 8,215,664.

(30) Foreign Application Priority Data

Oct. 30, 2007 (JP) ................. 2007-282478

(51) Int. Cl.
*B60R 21/213* (2011.01)
(52) U.S. Cl. ................. 280/728.2; 280/730.2
(58) Field of Classification Search ............... 280/728.2, 280/730.2
See application file for complete search history.

(56) References Cited

U.S. PATENT DOCUMENTS

| | | | |
|---|---|---|---|
| 5,906,395 A | 5/1999 | Isaji et al. | |
| 6,082,761 A | 7/2000 | Kato et al. | |
| 6,224,089 B1 | 5/2001 | Uchiyama et al. | |
| 6,497,429 B2 | 12/2002 | Matsumoto | |
| 6,811,184 B2 | 11/2004 | Ikeda et al. | |
| 6,860,506 B2 | 3/2005 | Ogata et al. | |
| 7,090,243 B2 | 8/2006 | Igawa | |
| 2007/0063489 A1 | 3/2007 | Dinsdale et al. | |

FOREIGN PATENT DOCUMENTS

| | | |
|---|---|---|
| CN | 1448294 | 10/2003 |
| DE | 197 31 729 | 1/1998 |
| DE | 698 15 408 | 1/2004 |
| DE | 603 09 088 | 3/2007 |
| EP | 0 855 316 | 7/1998 |
| EP | 1 350 691 | 10/2003 |
| JP | 10-203290 | 8/1998 |
| JP | 10-217898 | 8/1998 |
| JP | 2002-249013 | 9/2002 |
| JP | 2003-160018 | 6/2003 |
| JP | 2003-291772 | 10/2003 |
| WO | WO 2009/057431 | 5/2009 |

*Primary Examiner* — Joseph Rocca
(74) *Attorney, Agent, or Firm* — Brinks Hofer Gilson & Lione (57) ABSTRACT

A vehicle air bag device having an air bag that is formed integrally with an inflator insertion portion into which an inflator is inserted. The air bag device also includes a bracket that is formed to attach the inflator to a vehicle body side, and that includes an inflator side mounting portion mounted onto an outer side of the inflator insertion portion so as to partially cover the inflator insertion portion; a strip-form body that surrounds and integrates the inflator side mounting portion and the inflator disposed in the inflator insertion portion; and a seal portion that is formed on the inflator side mounting portion in alignment with the strip-form body.

2 Claims, 9 Drawing Sheets

VEHICLE AIR BAG DEVICE

CROSS REFERENCE TO RELATED APPLICATION

This application is a divisional application of U.S. application Ser. No. 12/738,586, filed Apr. 16, 2010, now U.S. Pat. No. 8,215,664 the entire contents of which are hereby incorporated by reference.

BACKGROUND

1. Field of the Invention

The present invention relates to a vehicle air bag device with which gas leakage prevention can be secured by an operation to mount a bracket on an inflator.

2. Related Technology

Patent Document 1, for example, is known as a vehicle air bag device in which an air bag is inflated and deployed by forming an inflator insertion portion integrally with the air bag, inserting an inflator into the inflator insertion portion, and causing gas discharged by the inflator to flow into the air bag through the inflator insertion portion. In Patent Document 1, the gas discharged by the inflator is prevented from leaking through a tubular connection port portion by constricting the connection port portion using a clamp such that the connection port portion closely contacts the inflator. Meanwhile, to attach the inflator to a body side, an attachment bracket is mounted on the inflator separately in a position removed from the clamp.

Patent Document 1: Japanese Patent Application Publication No. 2003-160018 (FIGS. 5 and 6)

In Patent Document 1, two operations must be performed separately to constrict the connection port portion using the clamp and mount the attachment bracket on the inflator, and therefore this method is unfavorable in terms of workability.

SUMMARY

The present invention has been designed in consideration of this problem in the prior art, and an object thereof is to provide a vehicle air bag device with which gas leakage prevention can be secured by an operation to mount a bracket on an inflator.

A vehicle air bag device according to the present invention includes: an air bag that is formed integrally with an inflator insertion portion into which an inflator for discharging a gas is inserted. The air bag is inflated and deployed when the gas flows therein from the inflator disposed in the insertion portion; a bracket that is formed to attach the inflator to a vehicle body side, and that is mounted onto an outer side of the inflator insertion portion so as to partially cover the inflator insertion portion; a strip-form body that surrounds and attaches the bracket to the inflator inserted in the inflator insertion portion; and a seal portion that is formed on the bracket in alignment with the strip-form body in order to seal a gap formed between the strip-form body and an front surface of the inflator insertion portion, where the gap is formed by a step located between a bracket front surface and the inflator insertion portion front surface.

The seal portion may be disposed on at least one of a pair of side edges of the strip-form body.

Further, a vehicle air bag device according to the present invention includes: an air bag that is formed integrally with an inflator insertion portion into which an inflator for discharging a gas is inserted. The air bag is inflated and deployed when the gas flows therein from the inflator disposed in the insertion portion; a bracket that is formed to attach the inflator to a vehicle body side, and that is mounted onto an outer side of the inflator insertion portion so as to partially cover the inflator insertion portion; a strip-form body that surrounds and integrates the bracket to the inflator inserted in the inflator insertion portion; and a reduced thickness portion that is formed on the bracket by reducing a thickness of the bracket in a direction extending toward a front surface of the inflator insertion portion, where the reduced thickness portion connects the front surface of the inflator insertion portion and the bracket in series in alignment with the strip-form body.

The reduced thickness portion is preferably formed in a position that is surrounded by the strip-form body.

Further, a vehicle air bag device according to the present invention includes: an air bag that is formed integrally with an inflator insertion portion into which an inflator for discharging a gas is inserted. The air bag is inflated and deployed when the gas flows therein from the inflator disposed in the insertion portion; a bracket that is formed to attach the inflator to a vehicle body side, and that is mounted onto an outer side of the inflator insertion portion so as to partially cover the inflator insertion portion; a strip-form body that surrounds and integrates the bracket and the inflator disposed in the inflator insertion portion; a reduced thickness portion that is formed on the bracket by reducing a thickness of the bracket in a direction extending toward an front surface of the inflator insertion portion, where the reduced thickness portion connects the front surface of the inflator insertion portion and the bracket in series alignment with the strip-form body; and a seal portion that is formed on the bracket in alignment with the strip-form body in order to seal a gap between the strip-form body and the front surface of the inflator insertion portion.

The reduced thickness portion is formed in a position that is surrounded by the strip-form body, and the seal portion is disposed on at least one of a pair of side edges of the strip-form body.

With the vehicle air bag device according to the present invention, gas leakage prevention can be secured by an operation to mount the bracket on the inflator.

DESCRIPTION OF THE REFERENCE SYMBOLS

| | |
|---|---|
| 1 | vehicle air bag device |
| 2 | air bag |
| 4 | inflator insertion portion |
| 4a | inflator insertion portion front surface 5 inflator |
| 6 | bracket |
| 8 | inflator side mounting portion |
| 8a | inflator side mounting portion front surface |
| 10 | strip-form body |
| 10a | side edge of strip-form body |
| 11 | seal portion |
| 14 | reduced thickness portion |
| h | step |
| s | gap |

DETAILED DESCRIPTION

Figure 1:
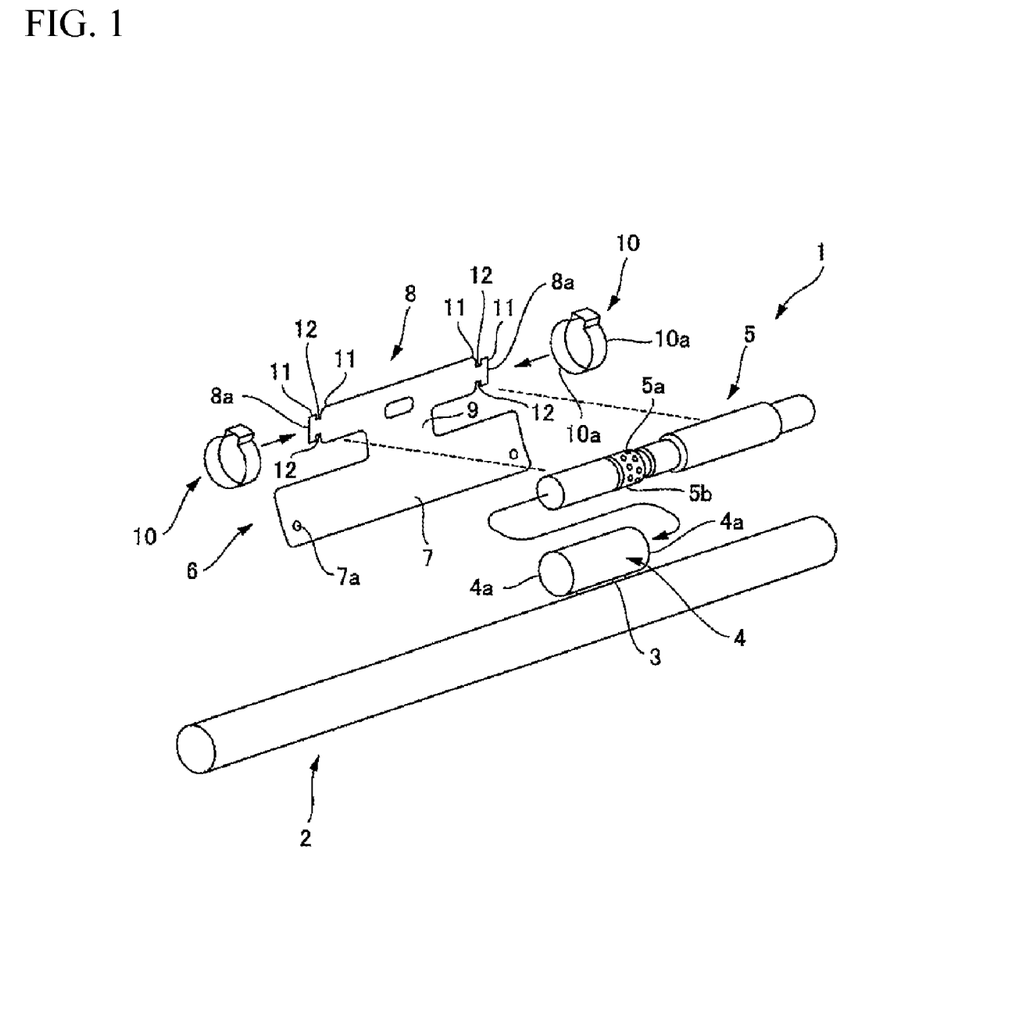
FIG. 1 is an exploded perspective view showing a first embodiment of a vehicle air bag device according to the present invention.
Figure 2:
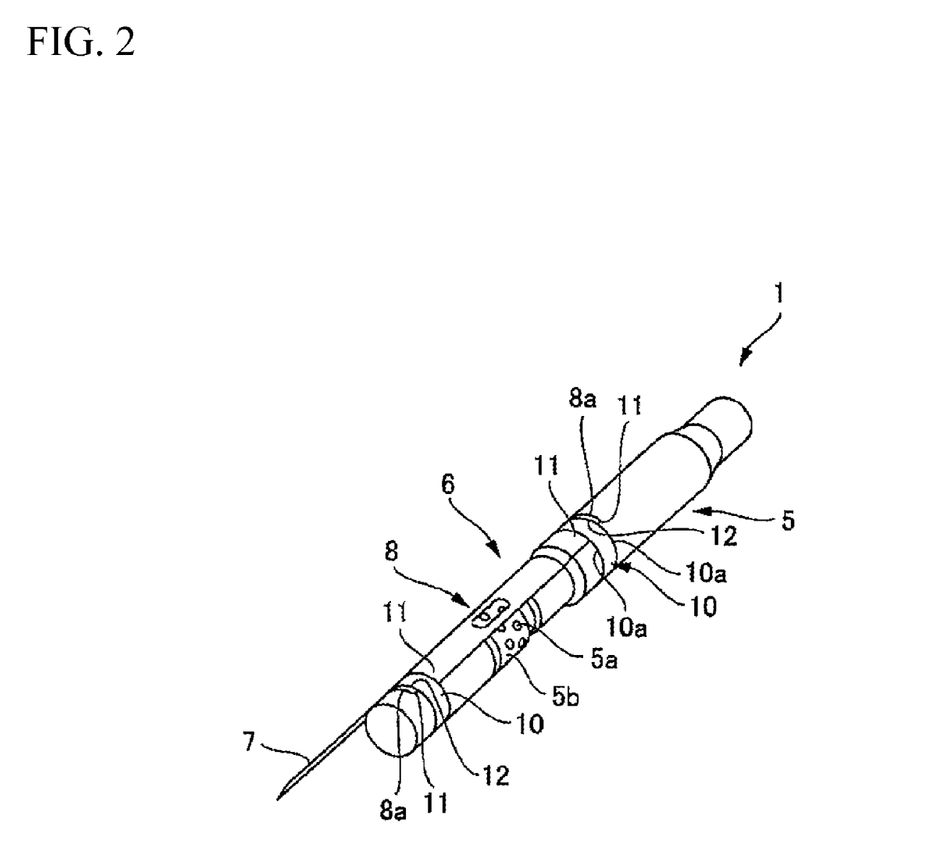
FIG. 2 is an assembly perspective view showing the vehicle air bag device of FIG. 1 but omitting an air bag including an inflator insertion portion.
Figure 3:
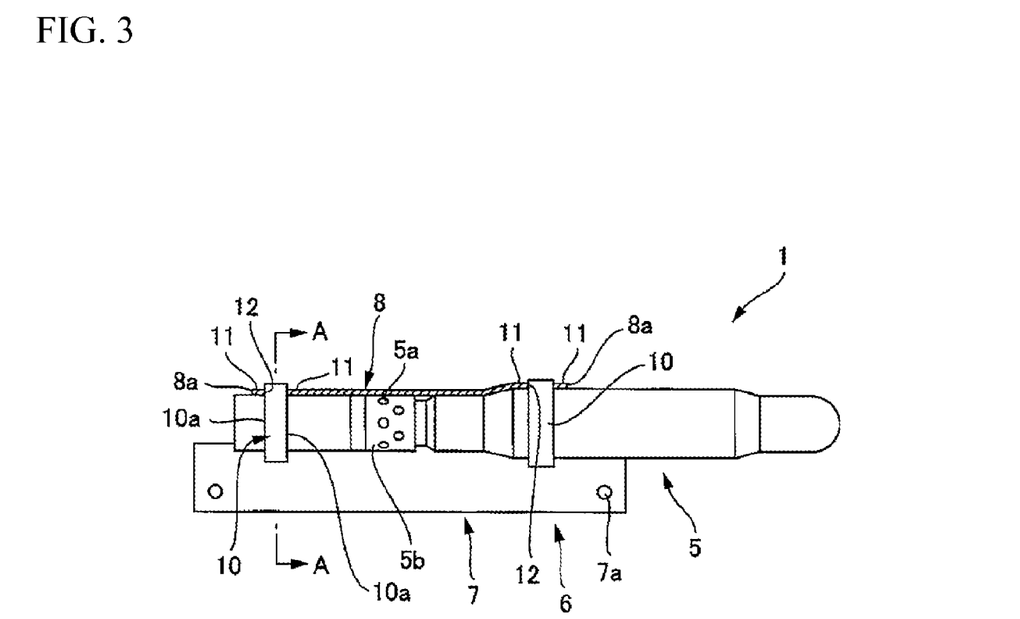
FIG. 3 is a partially cutaway side view showing the vehicle air bag device of FIG. 1 but omitting the air bag, similarly to FIG. 2.

A first embodiment of a vehicle air bag device according to the present invention will be described in detail below with reference to the attached drawings. FIG. 1 is an exploded perspective view showing a vehicle air bag device according to this embodiment. FIG. 2 is an assembly perspective view showing the vehicle air bag device of FIG. 1 but omitting an air bag including an inflator insertion portion, which is described below. FIG. 3 is a partially cutaway side view showing the vehicle air bag device of FIG. 1 but omitting the air bag, similarly to FIG. 2.

In this embodiment, a curtain air bag device that is inflated and deployed between an occupant seated on a seat and a vehicle body side portion is cited as an example of a vehicle air bag device 1. An air bag 2 attached to the curtain air bag device has a length in a front-rear direction of a vehicle body, and uses flexible fabric material that is well known in this type of air bag device. The air bag 2 of the curtain air bag device is wound into a roll for storage, as shown in the drawings. A sleeve-shaped inflator insertion portion 4 is formed integrally with the air bag 2 via a duct portion 3 disposed in an appropriate position in a length direction of the air bag 2. Respective end portions 4a of the inflator insertion portion 4 oriented in the length direction of the air bag 2 are open. The inflator insertion portion 4 communicates with the interior of the air bag 2 through the duct portion 3.

A cylindrical inflator 5 is inserted into the inflator insertion portion 4. A gas discharge portion 5b formed with a large number of hole portions 5a for discharging a gas is provided on one length direction side of the inflator 5. In this embodiment, the gas discharge portion 5b of the inflator 5 is mainly disposed inside the inflator insertion portion 4. The gas discharged through the gas discharge holes 5b in the inflator 5 is discharged into the inflator insertion portion 4. The gas discharged into the inflator insertion portion 4 flows into the air bag 2 via the duct portion 3, and as a result, the air bag 2 is inflated and deployed.

A bracket 6 for attaching the inflator 5 fixedly to an appropriate location on the vehicle body side is mounted on an outer side of the inflator insertion portion 4. In the illustrated example, the bracket 6 is formed by shaping a metal plate material. The bracket 6 is constituted by a plate-shaped vehicle body side attachment portion 7 in which a bolt insertion hole 7a is formed in an appropriate location, an inflator side mounting portion 8 that is formed in a curved shape such that a front cross-section thereof (a cross-section that is orthogonal to the length direction of the inflator 5) has an arch shape and that is engaged with the inflator insertion portion 4 and a connecting portion 9 formed between the attachment portion 7 and the mounting portion 8, thereby connecting these two components. The connecting portion 9 is formed in a substantially central position of the inflator side mounting portion 8 so as not to obstruct mounting of a strip-form body 10, to be described below.

The inflator side mounting portion 8 is formed such that its length is in the length direction of the inflator 5. Further, the arch-shaped cross-section of the inflator side mounting portion 8 is formed to match a front cross-sectional shape of the inflator 5 so as to cover the cylindrical inflator 5 disposed in the inflator insertion portion 4 from the outside. The inflator 5 is engaged with the inflator side mounting portion 8 by sliding the inflator 5 in the length direction of the inflator side mounting portion 8. By forming the inflator side mounting portion 8 with an arch-shaped cross-section, the inflator side mounting portion 8 is mounted on the inflator 5 so as to partially cover a periphery of the inflator insertion portion 4. When the inflator 5 is formed with a polygonal front cross-section, the inflator side mounting portion 8 is formed in an arch shape having a front cross-sectional shape that corresponds to the polygonal shape.

Figure 4:
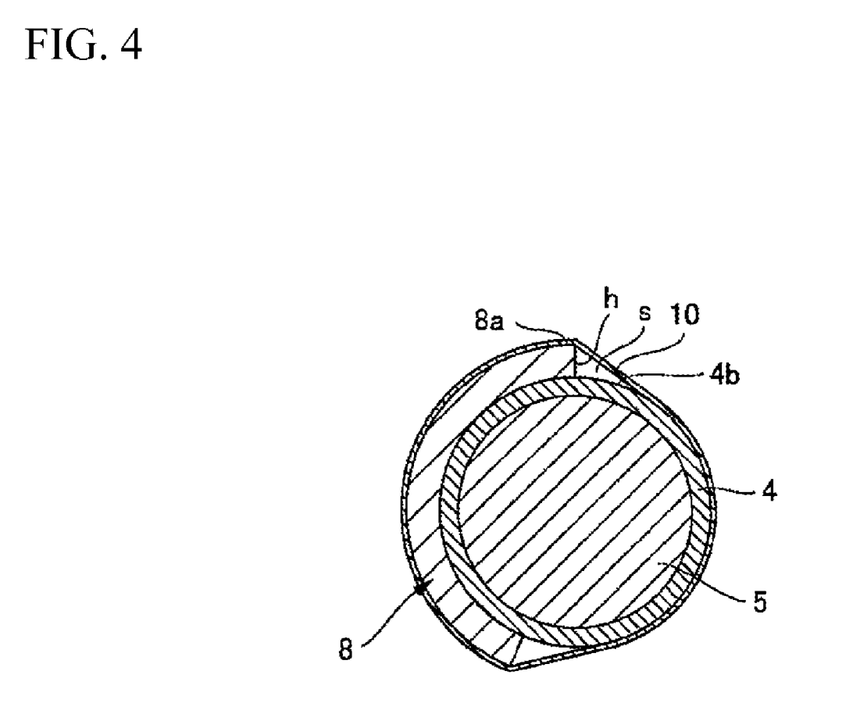
FIG. 4 is a front cross-sectional view of the vehicle air bag device, illustrating a problem encountered when a strip-form body is wrapped around a bracket and an inflator is inserted into the inflator insertion portion simultaneously.

A metal strip-form body 10 is wrapped around the periphery of the inflator side mounting portion 8 of the bracket 6 and the inflator 5 is disposed in the inflator insertion portion 4 mounted on the inflator side mounting portion 8 so as to surround and integrate these components simultaneously. FIG. 4 shows the strip-form body 10 in a wrapped state. As is evident from FIG. 4, the inflator side mounting portion 8 has a considerable thickness, and therefore, when the inflator 5 and the inflator side mounting portion 8 are integrated simultaneously by only the strip-form body 10, a step h corresponding to the thickness of the inflator side mounting portion 8 is formed between a front surface 8a of the inflator side mounting portion 8 and a front surface 4b of the inflator insertion portion 4 in which the inflator 5 is inserted.

When the inflator side mounting portion 8 and the inflator insertion portion 4 are surrounded by the strip-form body 10, the step h causes the strip-form body 10 to separate from the front surface 4b of the inflator insertion portion 4 and float upward, leading to the formation of a gap s in which a wrapping force of the strip-form body 10 cannot be applied. When the gap s is formed, gas discharged into the inflator insertion portion 4 may leak from the respective end portions 4a of the inflator insertion portion 4. To prevent this gas leakage, in this embodiment, a seal portion 11 for sealing the gap s is formed on the inflator side mounting portion 8 of the bracket 6.

The respective configurations of the bracket 6, the strip-form body 10, and the seal portion 11 according to this embodiment will be described in detail below using FIGS. 1 to 3 and FIGS. 5 to 7. In addition to the configuration described above, groove portions 12 are formed in the bracket 6 at an appropriate distance that is removed from the end edges 8a of the inflator side mounting portion 8 in the length direction of the inflator side mounting portion 8. The groove portions 12 are formed in respective end edges of the inflator side mounting portion 8 in the arch circumference direction. The inflator side mounting portion 8 is formed by means of the groove portions 12 with a substantially semicircular front cross-section in the position of the groove portions 12. In positions other than the groove portions 12, the inflator side mounting portion 8 is formed with a substantially C-shaped front cross-section having a longer circumference than the semicircular cross-section in the arch circumference direction. The part having the C-shaped front cross-section is formed in alignment with the strip-form body 10 to be longer than the range of the gap s between the strip-form body 10 and the inflator insertion portion 4, and as a result, the seal portion 11 is formed. The strip-form body 10 is attached to the inflator side mounting portion 8 by latching respective axial side edges 10a thereof to the groove portions 12 sandwiched between the seal portion 11.

Figure 5:
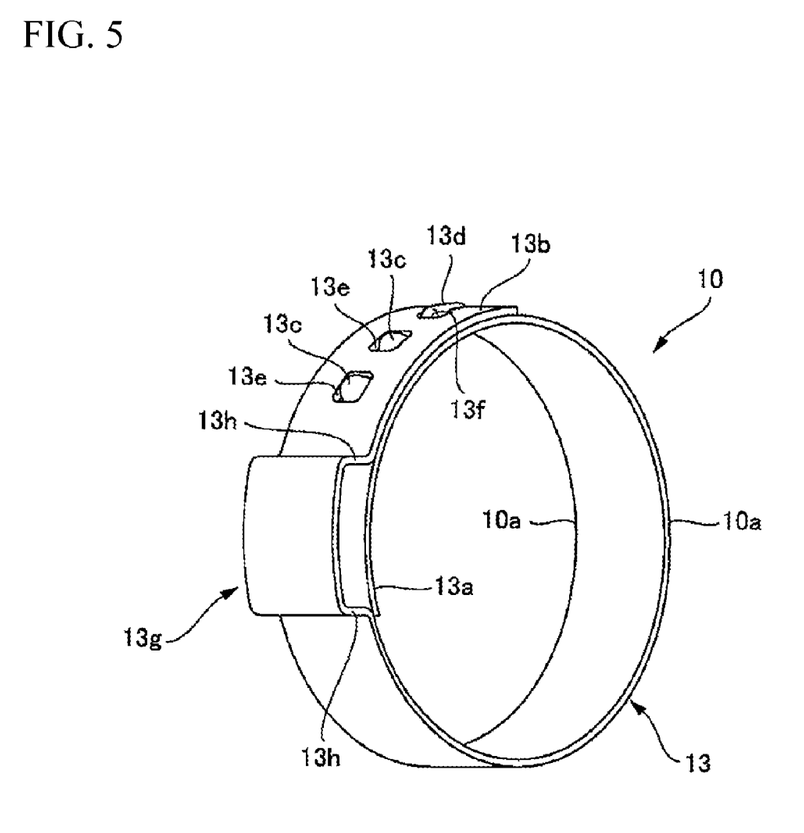
FIG. 5 is a perspective view showing the strip-form body used in the vehicle air bag device of FIG. 1.

As shown in FIG. 5, the strip-form body 10 is wrapped around the respective groove portions 12 of two length direction end edges 8a of the inflator side mounting portion 8. The strip-form body 10 is formed in a ring shape by overlapping respective end portions 13a, 13b of a single strip piece 13 on the outside and inside such that the two end edges 13a, 13b are free to slide relative to each other. Two projecting portions 13c and a hook 13d are formed at appropriate intervals in the first end portion 13a positioned on the inside of the strip piece 13. Meanwhile, two window holes 13e into which the projecting portions 13c are inserted and two engagement holes 13f with which the hook 13d is engaged are formed in the other end portion 13b positioned on the outside of the strip piece 13 in accordance with the positions of the projecting portions 13c and hook 13d. Further, an input portion 13g into which an operating force for reducing the diameter of the ring-shaped strip-form body 10 is input is formed on the strip piece 13 between the two end portions 13a, 13b. The input portion 13g includes a pair of leg portions 13h formed by raising the strip piece 13 radially outward. The hook 13d is formed in an opposite direction to a formation position of the input portion 13g so as to engage with the engagement holes 13f.

Figure 6:
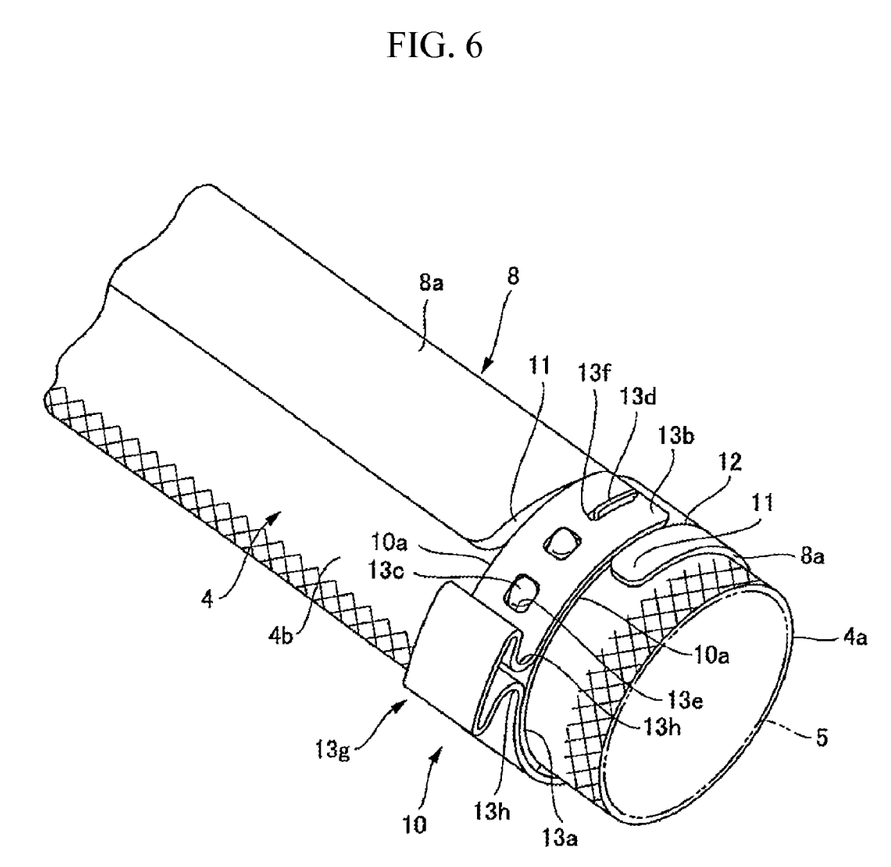
FIG. 6 is a partial perspective view showing a state in which the bracket and the inflator insertion portion are surrounded and attached by the strip-form body of FIG. 5.
Figure 7:
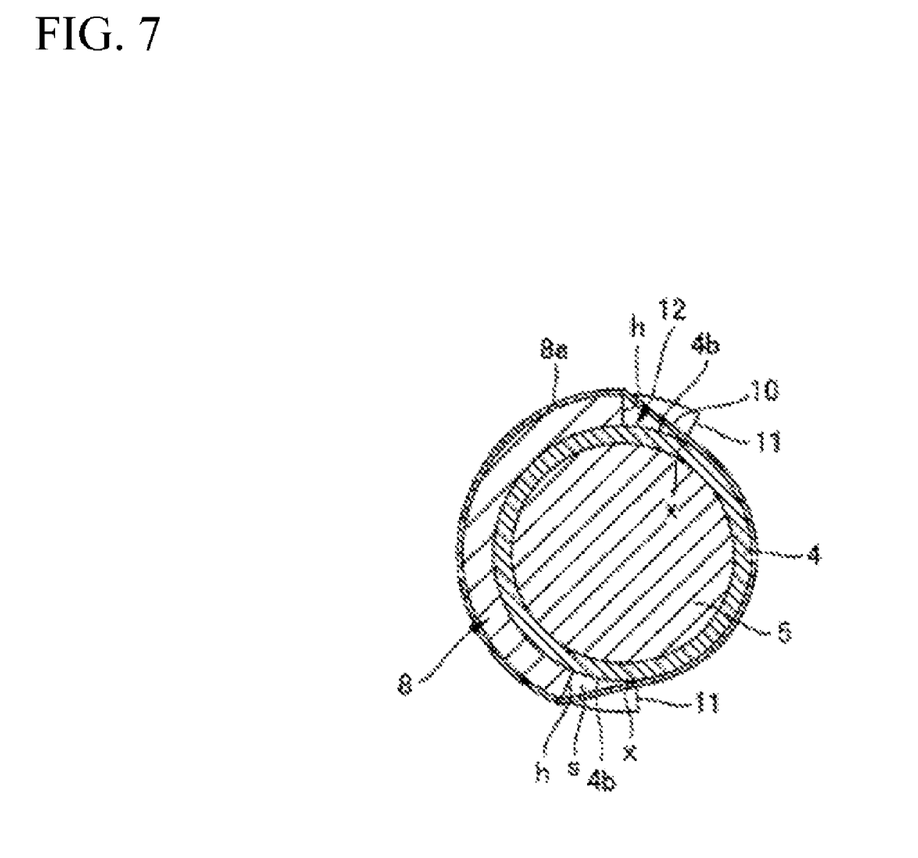
FIG. 7 is a front cross-sectional view seen from an A-A line arrow in FIG. 3.

When an operating force for deforming the strip-form body 10 such that the pair of leg portions 13h approach each other is input into the input portion 13g, first, the other end portion 13b of the strip piece 13 slides toward the input portion 13g relative to the first end portion 13a of the strip piece 13. As a result of this sliding motion, the engagement between the hook 13d and the engagement holes 13f strengthens, and at the same time, the window holes 13e push the projecting portions 13c. FIG. 6 shows the strip-form body 10 in a wrapped state where the projecting portions 13c are pushed such that the first end portion 13a side of the strip piece 13 is caused to slide below the other end portion 13b in a direction for increasing the overlap between the two end portions 13a, 13b, as a result of which the diameter of the strip-form body 10 is reduced. When the diameter of the strip-form body 10 is reduced, the inflator side mounting portion 8 of the bracket 6 is integrated with the inflator 5 in the inflator insertion portion 4. As shown in FIG. 7, the seal portion 11 formed on the inflator side mounting portion 8 extends at least from the step h to a position x in which the strip-form body 10 contacts the inflator insertion portion front surface 4b in order to seal the gap s that is formed between the strip-form body 10 and the front surface 4b of the inflator insertion portion 4 by the step h.

Next, a method of assembling the vehicle air bag device 1 and attaching it to a vehicle according to the first embodiment of the present invention will be described. To attach the vehicle air bag device 1 to the vehicle body, first, the inflator 5 is inserted into the inflator insertion portion 4 of the air bag 2, which is wound into a roll. Next, the inflator side mounting portion 8 of the bracket 6 is mounted onto the outside of the inflator insertion portion 4 so as to partially cover the inflator insertion portion 4. Next, the strip-form body 10 is wrapped around the bracket 6 and the inflator 5 inserted into the inflator insertion portion 4 such that the bracket 6 and the inflator 5 are integrated by the strip-form body 10. At this time, the strip-form body 10 is attached in alignment with the positions of the groove portions 12 between the seal portions 11. Thus, the gap s between the strip-form body 10 and the inflator insertion portion front surface 4b can be sealed by the seal portions 11 positioned on either side of the strip-form body 10. Finally, the vehicle side attachment portion 7 of the bracket 6 is fixed to the vehicle body. As a result, the vehicle air bag device 1 can be attached to the vehicle body.

Incidentally, with the vehicle air bag device 1 according to the first embodiment, an operation to fasten the inflator 5 to the inflator insertion portion 4 and an operation to mount the bracket 6 onto the inflator 5 can be performed simultaneously by attaching the strip-form body 10. Hence, in contrast to the prior art, there is no need to perform these two operations separately in different positions, and therefore a dramatic improvement in workability can be achieved.

When the operation to fasten the inflator 5 and the operation to mount the bracket 6 onto the inflator 5 are performed in the same position, the gap s, in which no wrapping force is applied by the strip-form body 10, is formed between the inflator side mounting portion front surface 8a and the inflator insertion portion front surface 4b by the step h generated as a result of the thickness of the bracket 6. However, the seal portion 11 for sealing the gap s is formed relative to the gap s on the inflator side mounting portion 8 in alignment with the strip-form body 10, and therefore a situation in which gas discharged into the inflator insertion portion 4 leaks out from the inflator insertion portion 4 through the gap s can be appropriately prevented. In other words, gas leakage from the two end portions 4a of the inflator insertion portion 4 can be prevented reliably even when the operation to fasten the inflator insertion portion 4 to the inflator 5 and the operation to mount the bracket 6 onto the inflator 5 are performed in a single location using only the strip-form body 10. As a result, a favorable operating characteristic can be secured in the air bag 2.

Further, the strip-form body 10 can be latched to the bracket 6 by the groove portion 12 or the seal portion 11, and therefore the strip-form body 10 can be positioned appropriately and easily, thereby ensuring that the strip-form body 10 is mounted on the bracket 6. In the illustrated example, the shape of the seal portion 11 is set by the shape of the groove portions 12, but the groove portions 12 need not be provided, and instead the seal portion 11 may be formed in a pawl shape that projects outwardly in alignment with the strip-form body 10 from the two side edges of the inflator side mounting portion 8 in the direction of the arch circumference.

In the first embodiment described above, the seal portion 11 is disposed on each of the pair of side edges 10a of the strip-form body 10, but the seal portion 11 may be formed along only one of the side edges 10a.

Figure 8:
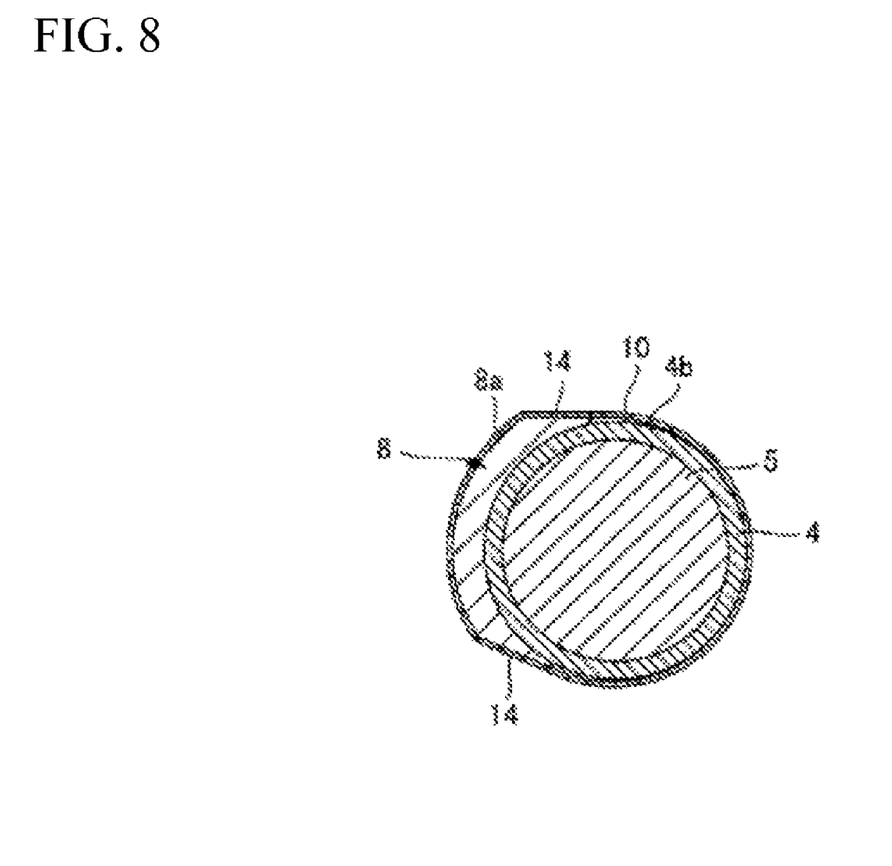
FIG. 8 is a view showing a second embodiment of the vehicle air bag device according to the present invention, corresponding to a front cross-sectional view seen from the A-A line arrow in FIG. 3.

FIG. 8 shows a second embodiment of the vehicle air bag device 1 according to the present invention. In the second embodiment, gas leakage is prevented by wrapping the strip-form body 10 closely around the inflator insertion portion 4 and the bracket 6, and a reduced thickness portion 14 having a reduced thickness is provided on a front surface side of the bracket 6 in place of the seal portion 11 to eliminate the step h that causes the gap s to form. The reduced thickness portion 14 is formed by reducing the thickness of the bracket 6 in tapered form that tapers in a direction toward the inflator insertion portion front surface 4b such that the inflator insertion portion front surface 4b and the bracket 6 are connected in series around the strip-form body 10. More specifically, the reduced thickness portion 14 is formed by reducing the thickness of the bracket 6 in a tangential direction of an outer profile of the inflator insertion portion 4 from a boundary position between the inflator side mounting portion 8 and the inflator insertion portion 4. The reduced thickness portion 14 is formed by subjecting the bracket 6 to press-molding or the like.

In the second embodiment, the operations for attaching the vehicle air bag device 1 to the vehicle body is performed similarly to the first embodiment, such that the operation of fastening the inflator 5 and the operation of mounting the bracket 6 onto the inflator 5 can be performed simultaneously and in the same position by applying the strip-form body 10. Therefore an improvement in productivity can be achieved. In the second embodiment, the step h is not formed by the thickness of the bracket 6, thus the strip-form body 10 can be wrapped closely around the inflator insertion portion 4 and the bracket 6 such that wrapping force supplied by the strip-form body 10 is applied appropriately and reliably thereto. Hence, gas leakage from the two end portions 4a of the inflator insertion portion 4 can be prevented reliably even when the operation of fastening the inflator insertion portion 4 to the inflator 5 and the operation of mounting the bracket 6 onto the inflator 5 are performed in a single location using only the strip-form body 10. As a result, a favorable operating characteristic can be secured in the air bag 2.

The reduced thickness portion 14 may be formed continuously around the entire length direction of the inflator side mounting portion 8 or only in the position that is surrounded by the strip-form body 10. In the latter case, the reduced thickness portion 14 serves as a mark for facilitating appropriate mounting of the strip-form body 10. The reduced thickness portion 14 is not limited to a tapered shape, and may of course be bent into a recessed shape, a projecting shape, and so on.

Figure 9:
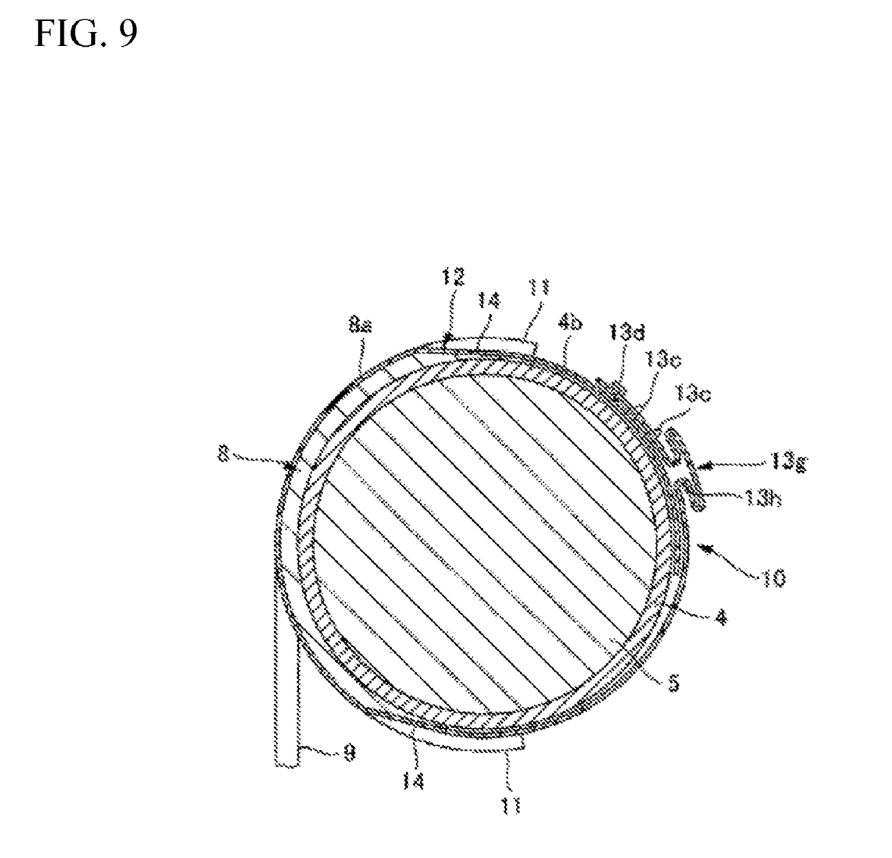
FIG. 9 is a view showing a third embodiment of the vehicle air bag device according to the present invention, corresponding to a front cross-sectional view seen from the A-A line arrow in FIG. 3.

FIG. 9 shows a third embodiment of the vehicle air bag device according to the present invention. In the third embodiment, the reduced thickness portion 14 of the second embodiment is provided adjacent to the seal portion 11 of the first embodiment. Regarding the relationship between the reduced thickness portion 14 and the seal portion 11, the seal portion 11 is formed in accordance with a formation region of the reduced thickness portion 14. Hence, even when the gap s is formed between the strip-form body 10 and the inflator insertion portion front surface 4b by the reduced thickness portion 14, the gap s can be sealed by the seal portion 11. As a result, the actions and effects of the first and second embodiments can be obtained more reliably. The reduced thickness portion 14 according to the third embodiment is preferably formed in a position that is surrounded by the strip-form body 10. Meanwhile, the seal portion 11 is preferably disposed along at least one of the pair of side edges 10a of the strip-form body 10 positioned on the reduced thickness portion 14. Needless to say, the seal portion 11 may also extend beyond the formation region of the reduced thickness portion 14.

The vehicle air bag device 1 described above is a preferred example of the present invention, and other embodiments may be implemented or executed using various methods. Unless specific limiting description is provided in the specification of this application, the present invention is not limited to the specific shapes, sizes, configurations, arrangements, and so on of the components illustrated in the attached drawings. Further, the expressions and terminology used in the specification of this application are provided for descriptive purposes, and unless specific limiting description is provided, the present invention is not limited to these expressions and terminology.

We claim:

1. A vehicle air bag device comprising:
   an air bag having an integrally formed inflator insertion portion;
   a gas discharging inflator disposed within said inflator insertion portion, wherein, when the gas is discharged by the inflator, the gas flows into the airbag, thereby inflating and deploying the airbag;
   a bracket configured to attach said inflator to a vehicle body, said bracket being mounted over an external surface of said inflator insertion portion and at least a portion of said inflator disposed therein, said bracket partially covering said inflator insertion portion; and
   a strip-form body disposed around an external portion of said bracket, said inflator insertion portion of said airbag, and said inflator disposed in said inflator insertion portion,
   wherein said bracket comprises a reduced thickness portion, said reduced thickness portion having a reduced thickness extending in a direction toward an inflator insertion portion front surface, said reduced thickness portion connecting said front surface of said inflator insertion portion and said bracket in series in alignment with said strip-form body; and
   wherein said bracket comprises a seal portion, said seal portion being in sealing alignment with said strip-form body to seal a gap disposed between said strip-form body and said front surface of said inflator insertion portion.

2. The vehicle air bag device according to claim 1, wherein said reduced thickness portion is disposed in a position that is surrounded by said strip-form body, and said seal portion is disposed on at least one of a pair of side edges of said strip-form body.

* * * * *